United States Patent [19]

Franke et al.

[11] 4,303,140
[45] Dec. 1, 1981

[54] TRANSPORT APPARATUS FOR HEAVY OPEN-CAST WORKING EQUIPMENT

[75] Inventors: Rudiger Franke, Mettmann; Rudolf Fauerbach, Hilden; Michael Wenzel, Düsseldorf; Aby Weiss, Monheim, all of Fed. Rep. of Germany

[73] Assignee: Mannesmann DeMag AG, Duisburg, Fed. Rep. of Germany

[21] Appl. No.: 85,263

[22] Filed: Oct. 16, 1979

[30] Foreign Application Priority Data

Nov. 11, 1978 [DE] Fed. Rep. of Germany ....... 2848996

[51] Int. Cl.³ .............................................. B62D 11/02
[52] U.S. Cl. ....................................... 180/6.2; 180/41; 414/498
[58] Field of Search ................ 180/140, 7 R, 6.2, 6.48, 180/6.62, 9.22, 9.24, 41, 14 C, 14 R, 9.42, 8 C, 8 F, 8 R, 9, 9.2 R; 52/143; 414/498, 787; 254/86 R, 86 H, 87, 2 R; 280/404, 81 R, 81 A; 172/23

[56] References Cited

U.S. PATENT DOCUMENTS

| | | | |
|---|---|---|---|
| 2,777,528 | 1/1957 | Jourdain | 180/8 C |
| 3,779,399 | 12/1973 | Shigeno et al. | 414/787 |
| 4,036,377 | 7/1977 | Weber | 254/87 X |

FOREIGN PATENT DOCUMENTS 1511140 5/1978 United Kingdom ............ 180/9.2 R

*Primary Examiner*—Joseph F. Peters, Jr.
*Assistant Examiner*—Randall A. Schrecengost
*Attorney, Agent, or Firm*—Mandeville and Schweitzer

[57] ABSTRACT

Transport apparatus is provided for heavy duty equipment which allows for the interchangeable connection of the caterpillar power drive units used for transport of a plurality of supporting frames holding different pieces of heavy equipment. A lesser number of expensive drive units is required for moving a lot of equipment. This is achieved by providing separate support bases or feet for each of the supporting frames. Each of the bases include a mechanism for lifting the supporting frames so that the power drive units can move under the supporting frame being transported. Also, each of the caterpillar power drive units include a connector device for connection to the supporting frame to be supported. Each connector device, in turn, includes hydraulically operated arms for relative vertical displacement between the drive unit and the support frame and universal relative horizontal displacement. In addition, electrical, mechanical or other connections are provided between the several power units to coordinate movement direction, steering, and the relative torsional effects of the various units on the supporting frame.

9 Claims, 4 Drawing Figures

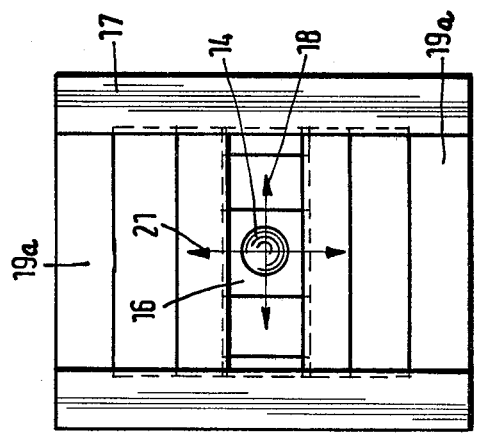
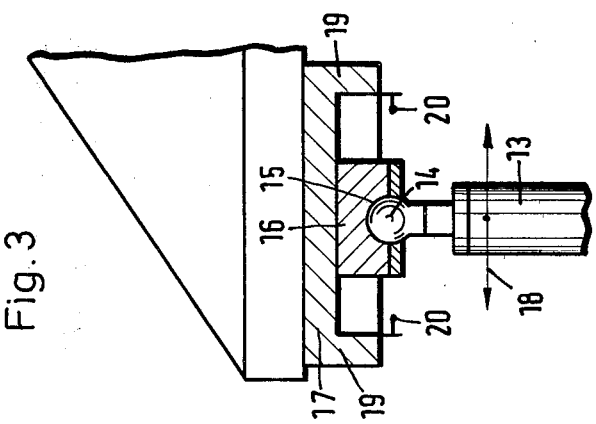

TRANSPORT APPARATUS FOR HEAVY OPEN-CAST WORKING EQUIPMENT

BACKGROUND AND STATEMENT OF THE INVENTION

The invention relates to transport apparatus for heavy open-cast working gear, which apparatus travels by means of caterpillar carriages. The carriages, in the form of twin caterpillars, are attached to the corners of a supporting frame formed as a horizontal isosceles triangle.

Open-cast working gear of this kind has been known for a long time. It may, for example, consist of excavators, rock crushers, or other similar heavy equipment. In recent years, there has been an increase in equipment which facilitates mixed continuous and discontinuous open-cast operation. To this end, equipment is used which is installed in stationary fashion. However, after a certain period of operation, it may be moved to other sites. In this connection, it has become known, for example, to provide rock crushers for reducing coarse rock with carriages, in order to transport these crushers or breakers, if required, to a location from where it is easy to remove the crushed rock, such as by means of a conveyor belt.

It is very involved to provide heavy working gear which is only rarely moved from one site to another, but which must be designed in a transportable fashion, with carriages which will then not be used for prolonged periods of time. Since the open-cast equipment mentioned consists of extremely heavy units of very large dimensions, the construction of the carriages must, accordingly, be stable. The expensive carriages, which are not being used, represent substantially under-utilized capital, to the extent where it is often considered advantageous to forego providing mobility for the equipment.

The present invention provides, by contrast, transport apparatus for heavy open-cast working gear, which counteracts the disadvantages mentioned, by retaining the mobility of the equipment, while considerably increasing the economic advantages of the carriages. This is achieved by the following characteristics of the invention:

(a) the caterpillar carriages are attached to the supporting frame by means of a clutch, so as to connect and disconnect them;
(b) the caterpillar carriages travel independently; and
(c) the supporting frame is provided with bases to support the open-cast apparatus on the level plane or ground.

This arrangement provides a mobile system where the actual caterpillar carriages are each placed under the equipment for purposes of transporting it, while in the quiescent state, the equipment rests on the supporting bases especially provided for this purpose. The independently movable carriages may, after depositing the equipment, find further use at the location for moving other equipment. In this way, it is possible to transport several pieces of equipment, successively, by means of the same carriages, and the carriages may be used individually in different ways.

Another feature of the invention is that the supporting bases, mentioned above, are attached to corner points of a horizontal isosceles triangle forming part of the supporting frame of the apparatus, and positioned about 180° relative to the triangular supporting frame used for the caterpillar carriages. Thus, the torsional axis runs approximately through the center of gravity of both triangles. This makes for a very stable and solid system, because the supporting plane has the same proportions or ratios for the support of the equipment on the caterpillar carriages, as for the support on the supporting bases.

Another feature of the invention is that the caterpillar carriages are coupled to each other electrically and/or hydraulically, and centrally controlled by means of a program. The independently traveling caterpillar carriages represent, in themselves, individual vehicles which are only coupled at the site of operation under the open-cast working equipment to be transported to make up one vehicle for combined action. All carriages are then controlled centrally from one location, such as from one caterpillar carriage via a program, giving the required signals to ensure synchronism.

Furthermore, provision is made for the supporting bases to be height adjustable and spatially flexible to each other in their arrangement on the supporting frame of the open-cast working equipment. By adjusting the supporting bases, differences in the ground level may be compensated for facilitating perpendicular installation of the open-cast working equipment. Simultaneously, the equipment may be installed at such a level by means of the adjustable supporting bases that the caterpillar carriages may be brought under their coupling points of the supporting frame.

Another feature of the invention is that the connections of the caterpillar carriages with the corner points of the triangular supporting frame are horizontally flexible and adjustable in height. By lowering or raising part of the connection between caterpillar carriage and the supporting frame, it may be raised or lowered versus the caterpillar carriage, so that the necessary space between the ground and the supporting frame may be created, which makes it possible to move the caterpillar carriages under the supporting frame and to remove them after lowering the supports.

The adjustability in height is made possible, according to another feature, by providing centrally on the frame of each twin caterpillar, one vertically movable piston-cylinder unit, with the upper end thereof formed as part of a ball-and-socket joint, while the other end is arranged on one of the corner points of the supporting frame. Needless to say, the supporting frame corner points of other open-cast working gear are similarly formed if it is intended to couple the caterpillar carriages selectively to different kinds of equipment.

Also, the invention provides that at least one of the caterpillar carriages is connected to the frame non-rotatably in the traveling plane. In this case, two caterpillar carriages are provided to steer the equipment. The third caterpillar carriage is connected non-rotatably with the carriage, however, allowing for rocking movement in order to balance irregularities in the ground. It is also conceivable to arrange two caterpillar carriages non-rotatably and parallel to each other. The steering in this case takes place by means of the third carriage, whose connection with the supporting frame allows for rotary movement.

Steering of the open-cast working gear, when being moved, can take place by utilizing the differential speed of the chains on either side. However, according to another feature of the invention, the steering of the open-cast working gear, when being moved, may be by means of length-adjustable tie rods arranged between the carriage frames and the carriage. These tie rods may consist of piston-cylinder units or spindles or shafts, making it possible to rotate the caterpillar carriages relative to the frame.

In order to reduce the considerable lateral forces occurring in the steering of the open-cast working gear around a non-rotatably mounted caterpillar carriage, another detail of the invention provides that the hinge point of the caterpillar carriages to the supporting frame is coordinated with a detector means for the lateral forces with which the gears of the caterpillar carriages may be actuated in the sense of a reduction of the lateral forces. These means may consist of measuring devices for sensing bending forces in the supporting frame, by means of which a signal is given to the carriage gears for countercontrol of the bending forces.

Another feature of the invention is to have two of the hinges of the caterpillar carriages to the supporting frame limited to the horizontal plane, and universally displaceable in order to eliminate lateral constraining forces on the carriage when moving the equipment. The displacement plane is coordinated with detectors, which signal before reaching the limits to correct the carriage. This proposal safely avoids constraining forces in the system, as these are eliminated within the displacement path of the hinge points. If the displacement path is insufficient to eliminate the constraining forces, corrective signals are given to the carriages before the end of the displacement path to steer them so that the constraining forces are counteracted even before they occur.

The transport apparatus of the invention allows for mobility of heavy open-cast working gear without incurring considerable investment cost, which might only be utilized at great intervals. The invention is particularly justified where a multitude of heavy equipment is to be moved from time to time, while it is stationary the rest of the time. The only extra expenditure versus purely stationary equipment is that the equipment to be transported must have raising means for receiving the caterpillar carriages, so that the latter may be connected and coupled to one another.

An example of the invention is shown in the drawings, and explained as follows:

DESCRIPTION OF THE DRAWINGS

FIG. 3 is a sectional view of the hinge connection of a caterpillar carriage to the supporting frame, and showing the displaceable arrangement; and FIG. 4 is a schematic view of the displacement plane of the apparatus shown in FIG. 3.

DETAILED DESCRIPTION OF THE INVENTION

Figure 1:
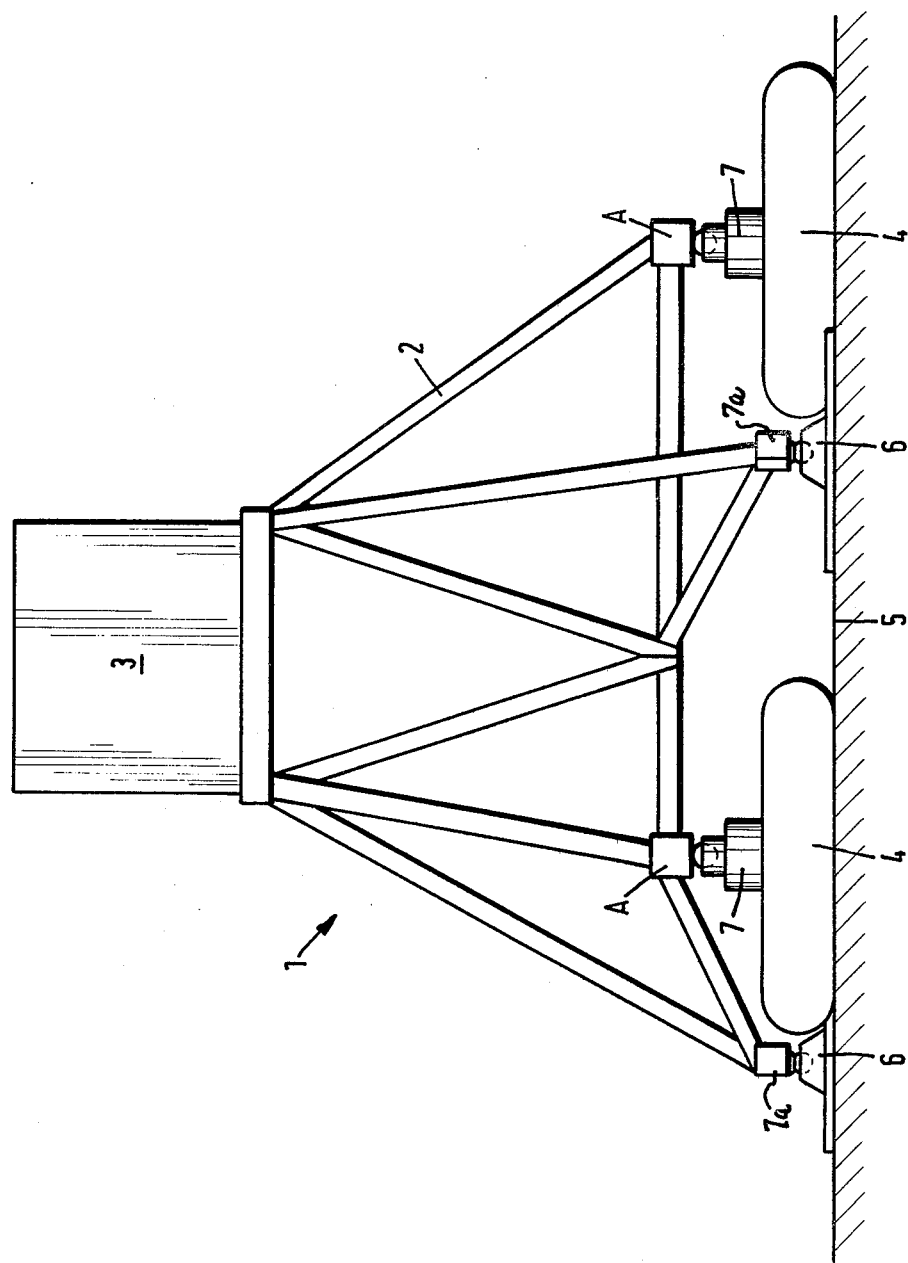
FIG. 1 is a side elevational view of transport apparatus illustrating the invention.

In FIG. 1 the transport apparatus is shown as 1. It consists of the supporting frame 2, to which is connected the apparatus 3 to be transported, such as, for example, a rock crusher. Carriages 4 are shown, to be connected and disconnected, traveling on the plane or ground 5, as well as supporting bases 6, also arranged on the supporting frame, and also supportable on the plane 5. Hinging of the carriages 4, as well as of the supporting bases 6, on the supporting frame is effected by means of ball-and-socket joints, which allow for compensation of irregularities of the plane. As indicated in FIG. 1 at 7, the frame of the carriages 4, formed as twin caterpillars, is each provided with a piston-cylinder unit, facilitating the raising and lowering of the transport apparatus. The supporting bases 6 are also attached to the supporting frame in a similar height-adjustable manner at 7a, so that irregularities in the ground in the sense of a horizontal supporting plane of the apparatus may be balanced.

Figure 2:
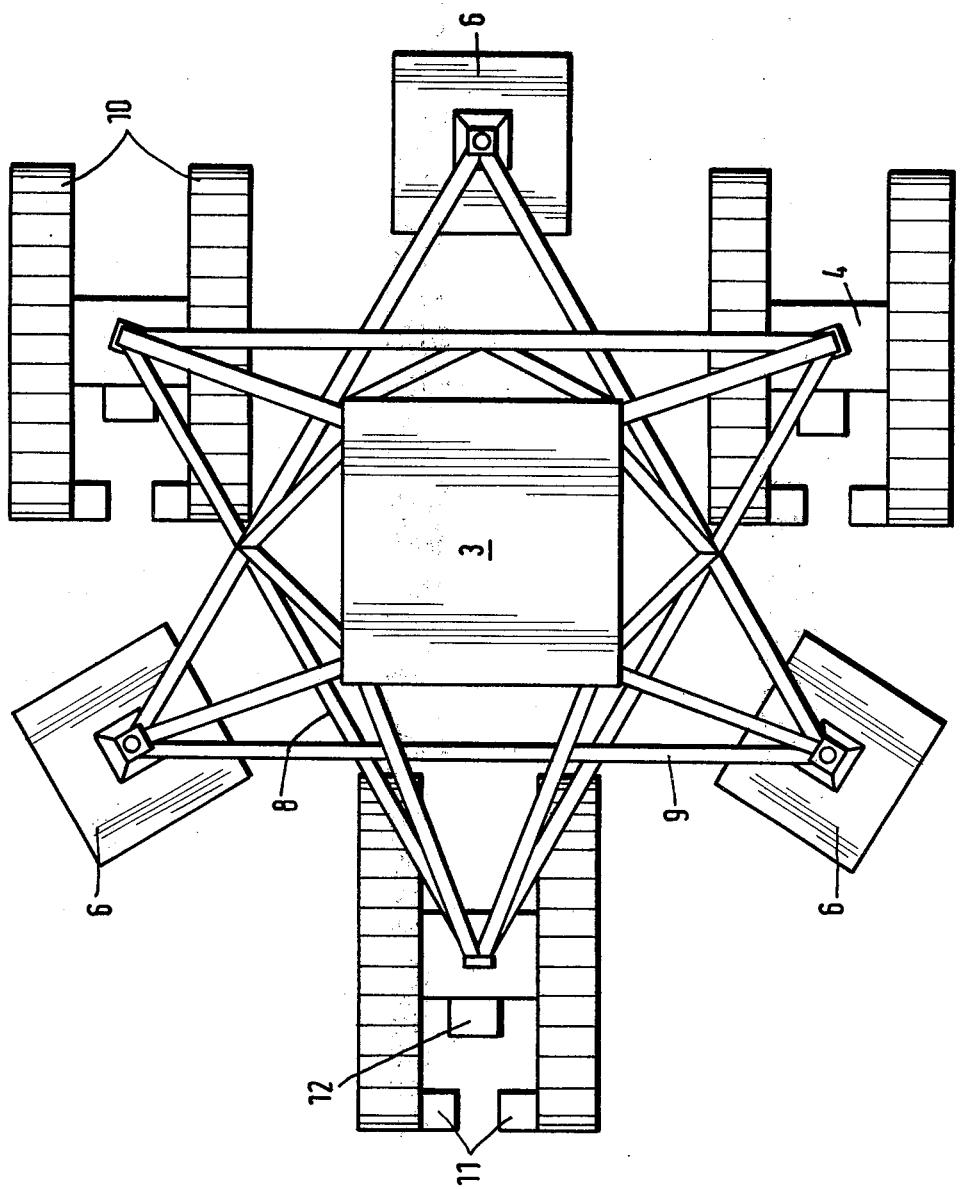
FIG. 2 is a top plan view of the transport apparatus of FIG. 1.

In FIG. 2, like parts are numbered alike. FIG. 2 also shows the formation of the supporting frame as two isosceles. In this example, the frame is shown as two even equilateral triangles 8 and 9, at whose corner points the caterpillar carriages 4 and/or the supporting bases 6 are provided. At 11, hydromotors are indicated for driving the twin caterpillars 10. At 12, the control stands are indicated by means of which the caterpillar carriages are independently controlled. With proper electric or hydraulic coupling, all carriages may be controlled as programmed by one control stand 12, when the carriages are connected, as will be understood.

FIG. 3 shows at 13, the upper part of the piston-cylinder unit 7, whose upper end carries the ball end 14, which is received in a properly formed joint socket 15 of a sliding block 16. The sliding block 16 is displaceable in a suitably formed receiver 17 in the direction of the arrow 18, so that the receiver 17 limits the displacement path of the sliding block 16 at each end by extensions 19. At a distance before the limits 19, switch devices 20 are provided, which signal before reaching the limit 19, to the carriage responsible for initiating the lateral forces through conventional connections not shown for clarity, so that it may be controlled in such a way as to avoid contact of the sliding block 16 with the limit 19.

As is shown in FIG. 4, representing a view parallel to the longitudinal axis of the piston-cylinder unit upward into the receiver, the sliding block 16 is displaceable not only in the direction of the arrow 18, but also at right angles thereto in the direction of the arrow 21, so that by overlay of both directions of motion a universal displacement of the sliding block 16 is ensured. Again, in the direction of the arrow 21, the moving path of the sliding block 16 is limited at 19a. Again, signal transmitters are provided before reaching the limit, which influence the carriages, in the sense of avoiding lateral forces, as already described.

The mode of operation of the transport apparatus is as follows: The equipment supported on the plane 5 by means of the support base 6 is to be transported to another site. To this end, the carriages 4 are transported to the apparatus, either each carriage individually or already coupled by means of electric or hydraulic clutches. The piston-cylinder units 7 are retracted, so that the caterpillar carriages may be moved under the hinge points A (FIG. 1). Now, if not already done so, the carriages are coupled in the manner described, so that all further measures can be taken centrally from one control unit 12. By extending the piston-cylinder units 7, the apparatus 3 is raised together with the supporting frame 2, whereby the supporting bases 6 are lifted off the plane 5. Now the transport apparatus may be moved. The caterpillar carriages are programmed for control in such a way that any desired direction may be taken.

After reaching the new site of the apparatus, the piston-cylinder units 7 are simultaneously retracted, so that the supporting bases 6 settle on the plane 5. Possible irregularities of the plane may be compensated for by adjusting the height of the hinges 7a of the supporting bases 6 at the supporting frame, so that a horizontal positioning of the frame is guaranteed. By further retracting of the piston-cylinder units 7, the hinges A of the caterpillar carriages 4 at the supporting frame 2 are disengaged, whereby it becomes possible to remove the carriage 4 individually or as a group. This ends the transport procedure.

We claim:

1. A transport apparatus for use in moving equipment from working site to working site, comprising:
   (a) a support frame for said equipment;
   (b) a first frame portion having an isosceles triangle configuration;
   (c) the corners of said first frame portion being provided with a plurality of selectively securable and removable transport means for moving said support frame and equipment;
   (d) a second frame portion having an isosceles triangle configuration, said second frame portion being positioned 180°, in a horizontal plane, relative to said first frame portion; and
   (e) said second frame portion being provided, at its corners, with ground engaging base members.

2. A transport apparatus as claimed in claim 1, wherein:
   (a) said transport means are twin caterpillar carriages; and
   (b) said twin caterpillar carriages are secured to the corners of said first frame portion by a centrally located ball and socket connection.

3. A transport apparatus as claimed in claim 1, wherein:
   (a) the corners of said first frame portion are provided with vertically adjustable means for raising and lowering said corners of said first frame portion so that said first frame portion can selectively secure and remove said transport means.

4. A transport apparatus as claimed in claim 3, wherein:
   (a) said vertically adjustable means are hydraulically operated ball and socket connections.

5. The apparatus of claim 1, further characterized by
   (a) adjusting means on each said ground engaging base members for engaging said second frame portion; and
   (b) said adjusting means including means for the relative vertical and horizontal displacement of each said ground engaging base members with respect to said second frame portion.

6. The apparatus of claim 2, further characterized by each of said ball and socket connections including
   (a) a vertically positioned piston-cylinder unit on said caterpillar carriage;
   (b) one part of said ball and socket joint positioned on the top of said piston-cylinder unit; and
   (c) the second part of said ball and socket joint positioned on said first frame portion.

7. The apparatus of claim 2, further characterized by
   (a) the differential speed between the twin tracks of said plurality of twin caterpillar carriages is utilized to steer said apparatus when moving.

8. The apparatus of claim 6, further characterized by
   (a) each of said ball and socket connections includes means for the universal horizontal displacement of each of said piston-cylinder units relative to said first frame portion.

9. The apparatus of claim 8, further characterized by
   (a) sensing means in said universal horizontal displacement means for sensing the limit of horizontal displacement in one direction of movement; and
   (b) whereby sensed movement toward the limit in one said universal horizontal displacement means can be corrected.

* * * * *